United States Patent [19]

Shemtov

[11] 4,030,153

[45] June 21, 1977

[54] ATTACHMENT FOR THREAD CUTTING APPARATUS

[75] Inventor: Sami Shemtov, Brooklyn, N.Y.

[73] Assignee: I-T-E Imperial Corporation EFCOR Division, East Farmingdale, N.Y.

[22] Filed: Oct. 14, 1975

[21] Appl. No.: 621,829

[52] U.S. Cl. .................... 10/89 WH; 10/107 R; 10/129 WH; 10/166
[51] Int. Cl.² ..................................... B23G 1/02
[58] Field of Search ............... 10/11 T, 12 T, 72 T, 10/76 T, 89 WH, 107 R, 129 WH, 139 WH, 162 R, 166; 214/1 BB; 72/422, 424, 427; 408/70

[56] References Cited

UNITED STATES PATENTS

| 1,615,538 | 1/1927 | Ehrman et al. | 10/165 |
| 3,015,117 | 1/1962 | Braendel et al. | 10/107 R |
| 3,105,399 | 10/1963 | Strugala et al. | 10/166 |
| 3,748,674 | 7/1973 | Powell et al. | 10/72 R |
| 3,754,667 | 8/1973 | Storch | 214/1 BB |

*Primary Examiner*—Carl E. Hall
*Assistant Examiner*—E. M. Combs

*Attorney, Agent, or Firm*—Friedman, Goodman & Teitelbaum

[57] ABSTRACT

An attachment for apparatus that is arranged to cut threads on a tubular workpiece. The attachment includes a vertically oriented chute for delivering a stream of the tubular workpieces, by gravity, to a retractable pin on which the lowermost workpiece is supported. A reciprocating member is provided with spring biased jaws for gripping and removing the lowermost workpiece from the pin at the receiving station. The workpiece is moved into opposition with a plunger which transfers the unthreaded workpiece to the thread cutting apparatus. After the threads are cut, the plunger then retracts, together with the threaded workpiece, which is stripped therefrom by a second pair of spring biased jaws and carried away from the plunger so that the now threaded tubular workpiece may be discharged. The first and second pair of jaws move in synchronism with each other and in timed relationship with the transfer member so that, as the lowermost, unthreaded tubular workpiece is being remove from the receiving station, the workpiece that has been previously threaded is concurrently being moved towards the discharge point.

9 Claims, 8 Drawing Figures

ATTACHMENT FOR THREAD CUTTING APPARATUS

BACKGROUND OF THE INVENTION

This invention relates generally to the machine tool arts and more particularly to an attachment for a thread cutting machine.

There is a substantial need for apparatus that will automate the cutting of threads on tubular workpieces or the like with a minimum of manual operations. In view of the high cost of labor and in order to keep the unit cost of the workpiece at a minimum, it is desirable that the machine or attachment be capable of operating as automatically as possible and at the highest possible speed with the least loss of time between various stages of operation.

SUMMARY OF THE INVENTION

The present invention provides apparatus that meets the foregoing requirements. In the present invention, external threads may be cut on a metallic, tubular member that is used, for example, as a coupling for joining internally threaded conduits or the like. For purposes of illustration and without intending to be limiting, the tubular member utilizing the present invention is provided with upper and lower external threads and an intermediate enlarged portion that is hexagonal in transverse cross section. The tubular workpieces are fed as a stream into a vertically oriented loading chute so that the workpieces may be moved downwardly under the influence of gravity. Directly opposite the lower end of the discharge chute there is provided an upwardly biased piloting pin having cam surfaces thereon. The lowermost workpiece in the stack is loosely mounted on the piloting pin which is adapted to be lowered out of engagement with the workpiece when the workpiece is to be removed.

There is also provided a transversely slidable plate that may be reciprocated by any suitable means such as an air cylinder. The plate includes a first pair of opposed jaws that are normally biased in a direction towards each other. The first pair of jaws carries a cam follower that is arranged to engage the angularly oriented cam surface that is integral with the piloting pin so as to withdraw the piloting pin and thereby enable the first pair of jaws to grasp the lowermost workpiece. When the slidable plate is moved in the opposite direction by the first air cylinder, the lowermost workpiece is carried by the jaws into a position that is in opposition to a second actuator which may also be an air cylinder having a plug mounted on the piston thereof. The plug will, when the second air cylinder is actuated, drive the lowermost workpiece downwardly to a position intermediate a pair of rotatable thread cutters.

After the threads are cut, the piston of the second actuator, which is still in contact with the workpiece, is moved upwardly and the workpiece is automatically stripped off of the piston by means of a second pair of jaws that are carried by the slidable plate. During this time, the slidable plate has again been moved by the first air cylinder back to its first position adjacent to the piloting pin.

Normally, during a complete cycle of the apparatus, the second pair of jaws will strip the threaded workpiece from the plug at approximately the same time that the first pair of jaws grips the lowermost workpiece in the stack. In addition, the second pair of jaws is arranged to release the threaded workpiece at approximately the same time that the second actuator moves the unthreaded workpiece towards the thread cutting means. Thus, no time is lost between the various operations. As will be pointed out more fully hereinafter, the foregoing cycle of operation occurs for all but the first workpiece that is to be threaded.

It is therefore an object of the present invention to provide an attachment for thread cutting apparatus.

Another object of the present invention is to provide an attachment, as described above, wherein threads are cut externally on tubular workpiece.

A further object of the present invention is to provide an attachment, as described above, that is automatic in operation.

An additional object of the present invention is to provide an attachment for thread cutting apparatus, wherein the threaded workpiece is removed at approximately the same time that an unthreaded workpiece is delivered.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

DESCRIPTION OF THE PREFERRED EMBODIMENT

The present invention is comprised of several major components or sections, for example delivery means for supplying a stream of workpieces to a receiving station, reciprocating means that grip and remove one workpiece at a time from the receiving station, means for transferring the workpiece that was removed from the receiving station to and from means for cutting the threads and discharge means that receive the threaded workpiece from the transfer means after the threads are cut. The foregoing major elements of the present invention will each be structurally described together with their interaction and then the mode of operation of the entire device will be described hereinafter.

Figure 1:
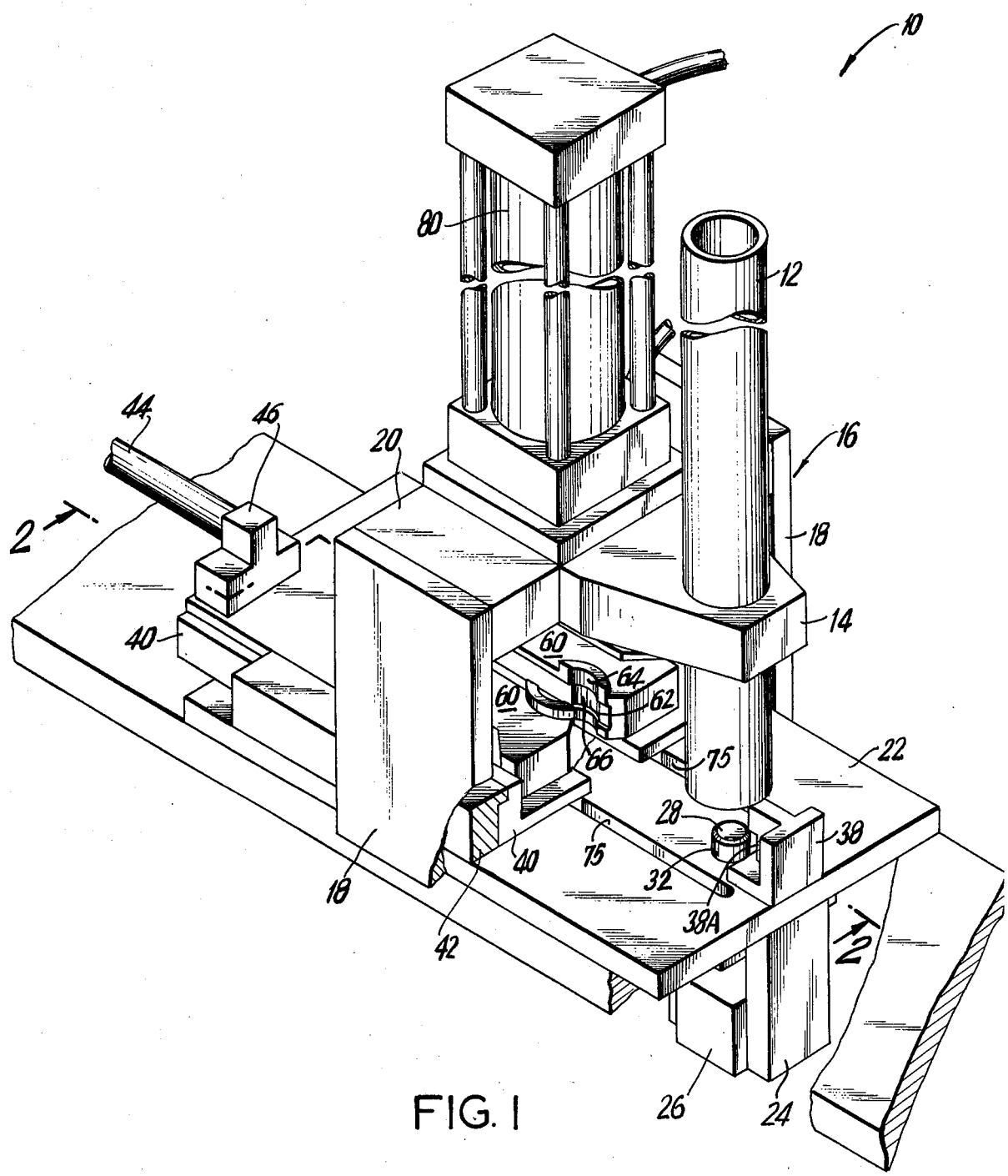
FIG. 1 is a perspective view, partially broken away and partially in cross section illustrating the structure comprising the present invention.

The discharge means of the apparatus 10 comprises a vertically oriented tubular chute 12 that is secured to and passes through a lug 14 which is part of the superstructure 16 that includes a pair of laterally spaced apart, upright side walls 18. A transverse wall 20 is secured to and extends between the upper ends of the side walls 18 which, at their lower ends are secured to a fixed or non-movable base plate 22 having a through hole 23 at one end thereof. As may best be seen in FIG. 1, the superstructure 16 is positioned above and straddles the fixed base plate 22.

Figure 2:
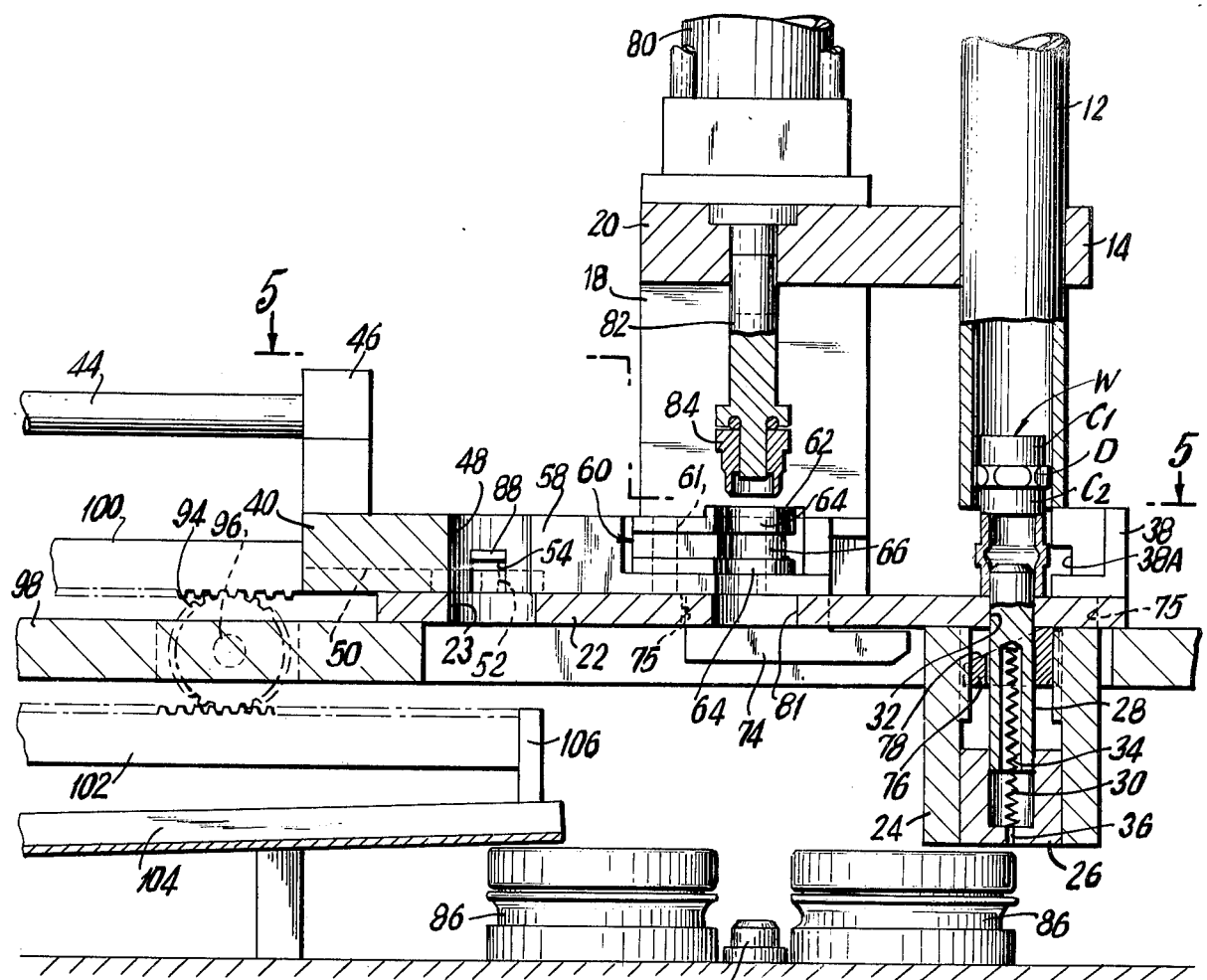
FIG. 2 is a longitudinal sectional elevational view taken along line 2—2 of FIG. 1.

Turning now more specifically to FIG. 2 for example, it will be seen that the delivery means is further comprised of a housing 24 which is rigidly secured to the underside of the baseplate and is coaxially in alignment with the chute 12. The lower end of the housing 24 is provided with a cup-shaped plug 26 in which a pin 28 is slidably mounted. A spring 30, extending between the basewall of the cup-shaped member 26 and the pin 28 biases the pin 28 upwardly through a hole 32 formed in the base plate 22 such that the upper end of the pin 28 normally extends above the upper surface of the baseplate 22. Preferably, an axially extending hole 34 is formed in the lower end of the pin 28 in order to receive the other end of the spring 30. A relief opening 36 may be formed in the basewall of the cup-shaped member 26 in order to assure free sliding movement of the pin 28. Finally, a support block 38 is secured to the upper surface of the baseplate 22. The support block 38 includes a notch 38A whose function will be described fully hereinafter.

It will be appreciated from the foregoing that, as a plurality of the workpieces W are stacked one above the other in the chute 12, they will move downwardly under the influence of gravity so that the lowest one of the workpieces W will be mounted on the upper end on the pin 28. For purposes of this description it should be understood that the workpieces W may be tubular metallic members having an enlarged central section D which may be in the form of a hexagon in transverse cross section. As shown in FIG. 2 for example, the workpiece W includes a cylindrical portion C1 above the central portion D and a cylindrical portion C2 below the hexagonal central portion D. It is the cylindrical portions C1 and C2 that are to be threaded.

Figure 7:
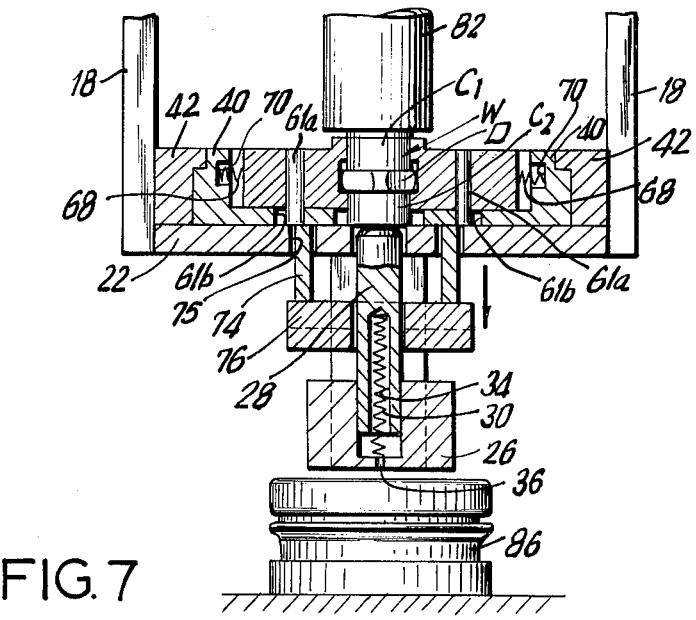
FIG. 7 is a transverse sectional elevational view taken along line 7—7 of FIG. 6.

The means for removing the workpieces W, one at a time, from the receiving station described hereinabove is comprised of a slidable plate 40 that is mounted on the top of the fixed plate 22 and which is guided for reciprocating movement from right to left and from left to right as is shown for example in FIGS. 2, 3 and 4 by means of fixed, laterally spaced apart guide members 42 which are best shown in FIG. 7. Actuating means in the form of a conventional air cylinder (not shown) having an axially displaceable piston 44 are used for moving the slidable plate 40 back and forth. The free end of the piston 44 is rigidly secured to a block 46 which is in turn mounted on the upper surface of the slidable plate 40.

Figure 5:
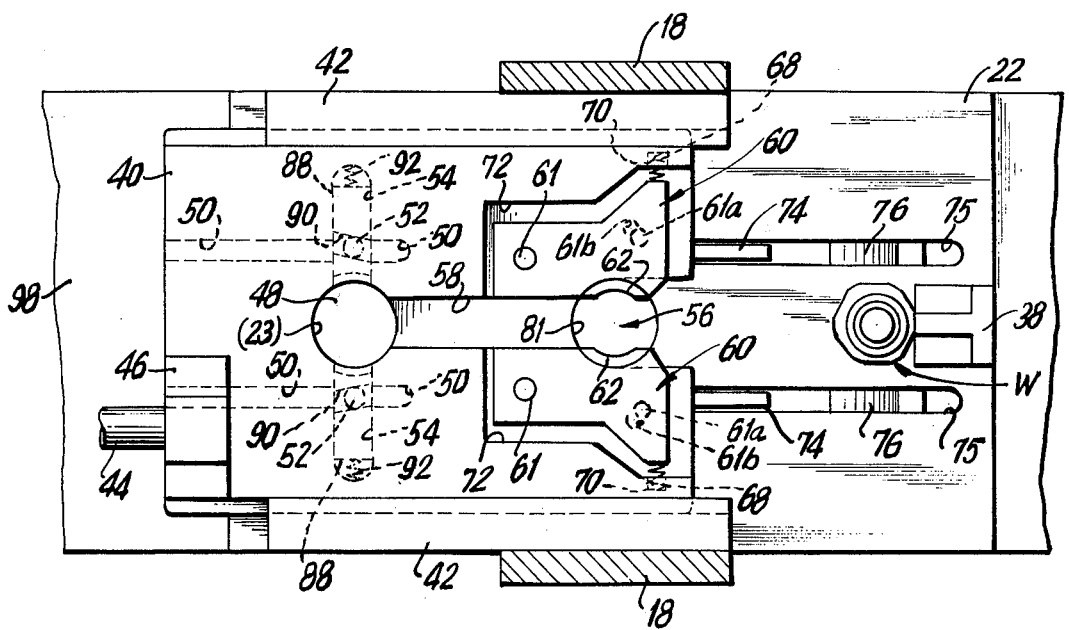
FIG. 5 is a fragmentary plan view taken along line 5—5 of FIG. 2.

Referring now specifically to FIG. 5, it will be seen that the slidable plate 40 has, for purposes to be described more fully hereinafter, a hole 48 therethrough. Straddling the hole 48 and extending from the left hand end of the plate 40 on the under side thereof, are a pair of channels 50 that are arranged to receive a pair of cam pins 52 that extend upwardly from the fixed plate 22. The slidable plate 40 is further provided with transversely oriented slots 54 that intersect the channels 50 as well as the opening 48 for purposes to be described more fully hereinafter. In addition, the slidable plate 40 is provided with a recess 56 on the upper surface thereof and at the right hand end thereof, as shown in FIG. 5. The recess 56 is connected to the hole 48 by means of a slot or groove 58.

A pair of jaws 60 are mounted in the recess 56 by means of pivot pins 61. The jaws 60 which are identical and straddle the longitudinal center line of the removable plate 40 are guided by pins 61a positioned in slots 61b. The gripping surfaces of the jaws 60, which one generally designated by the reference character 62 in FIG. 5, are comprised of upper and lower faces 64 and an intermediaate recess 66. The upper and lower faces 64, as shown best in FIGS. 1 and 2, engage the cylindrical portions C1 and C2 of the workpiece W while the recess portion 66 receives the hexagonal central portion D of the workpiece W, as shown in FIG. 7. The gripping surface 62 of the jaws 60 are normally biased in a direction towards each other by means of springs 68 which are received in confronting openings 70 formed on the sidewall 72 of the recess 56 in the slidable plate 40.

In order to permit removal of the lowermost workpiece W from its initial position at the bottom of the chute 12 and on the upper end of the pin 28, a pair of cam followers 74 are secured to the underside of the movable plate 40 and are moved together therewith when the plate 40 is displaced by the piston 44. The cam followers 74 travel through and are guided in a pair of elongated slots 75 in the fixed plate 22 and are arranged to engage a pair of cam blocks 76, each of which has a cam surface 78.

The cam blocks 76 are secured to opposite sides of the pin 28 for movement therewith. As shown for example in FIGS. 2 and 3, the cam surfaces 78 slope upwardly from left to right so that when the cam followers move from left to right in the manner described hereinabove, the cam blocks 76 will urge the pin 28 connected thereto downwardly against the biasing force of the spring 30, and therefore remove the upper end of the pin 28 from the interior of the workpiece W. The jaws 62 will then be spread apart by the workpiece W against the biasing force of the springs 68 so that the jaws 60 may be clamped about the workpiece W.

Figure 3:
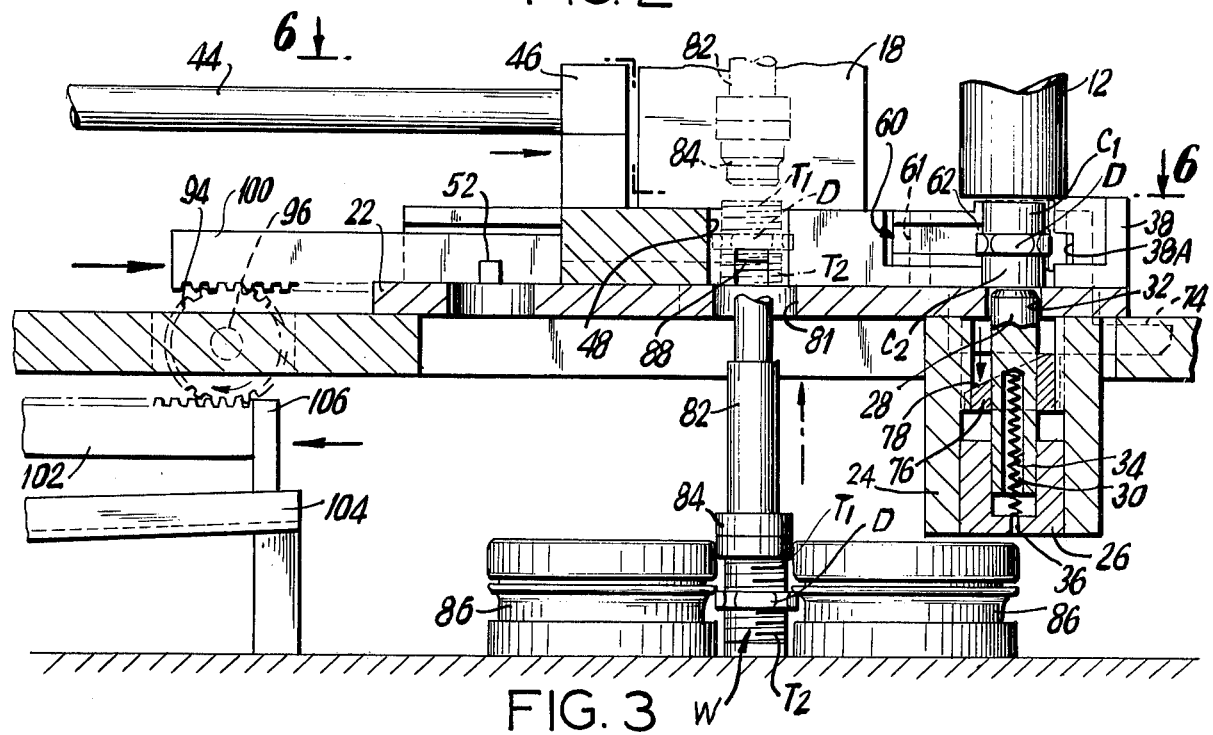
FIG. 3 is a longitudinal sectional elevational view similar to FIG. 2 but illustrating another stage of the cycle of operation.
Figure 6:
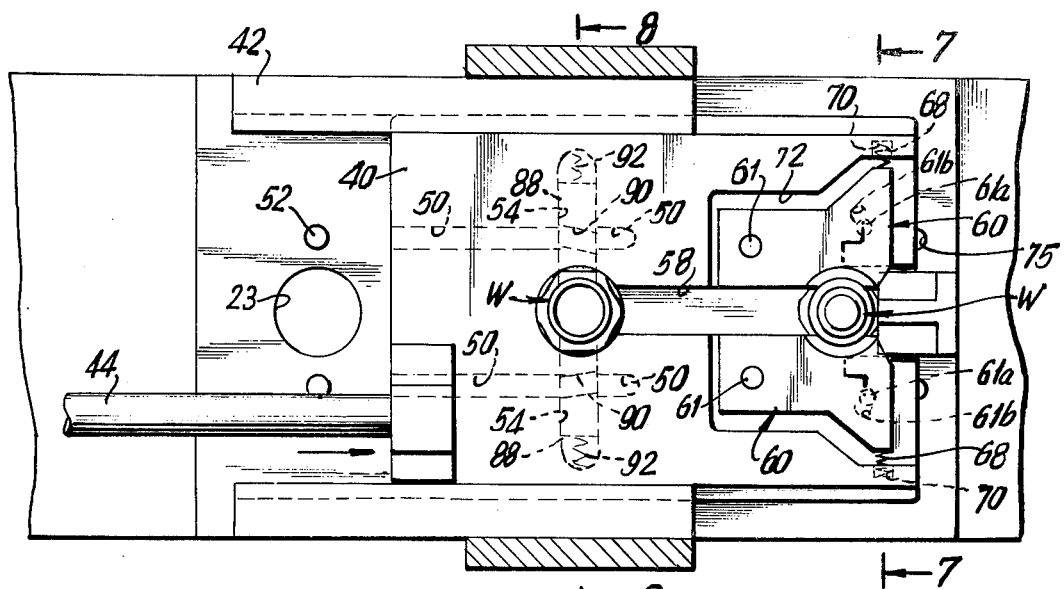
FIG. 6 is a fragmentary plan view taken along line 6—6 of FIG. 3.

After the lowermost workpiece W has been engaged by thejaws 60, as shown in FIGS. 3, 6 and 7, it is moved to the means for forming the threads thereon. Piston 44 first moves the movable plate 40 fully to the left into coaxial alignment with a second actuator which may be in the form of an air cylinder 80 that is suitably mounted on the transverse connecting member 20 of the superstructure 16 and coaxially with an opening 81 in the fixed plate 22. The air cylinder 80 has a piston 82 on the output end of which is removably secured a pilot plug 84 so that workpieces W of different size may be accommodated thereon. When the piston 44 of the first actuator has moved the plate 40 to the left to a postion wherein the opening 48 of the movable plate 40 is coaxial with the opening 23 formed in the fixed plate 22, the workpiece W that is positioned in the jaws 60 will be coaxial with the piston 82 of the second actuator 80 so that the plug 84 may be inserted into the workpiece W, as shown in FIG. 4.

In a manner to be described more fully hereinafter, the air cylinder 80 actuates the piston rod 82 thereof so as to transfer the workpiece W from the jaws 60 to a position intermediate a pair of counteracting thread cutting dies 86 and on an arbor 87 therebetween, all of which structure and mode of operation are conventional and, as such, do not form a part of the present invention. The dies 86 clamp the workpiece and the piston rod 82 remains in the down position, as shown in FIG. 3.

It should be noted at this time that when the piston 82 transfers the workpiece W from the jaws 60 to the thread cutting rollers 86, the workpiece W will pivot the jaws 60 outwardly about the pivot pins 61 and against the force of the springs 68. After the threads T1 and T2 are cut on the cylindrical sections C1 and C2, respectively, of the workpiece W, as shown in FIG. 3, the piston 82 is again actuated to pick up the rolled workpiece and return the workpiece through the holes 48, 81, in suitably timed relationship which will be described more fully hereinafter. That is, the movable plate 40 has been moved to the right by the piston 44 after the plug 84 passed through the recess 56 and the opening 81, where the slot 58 allows the piston 82 to pass through to the opening 48 while the piston 82 is in the down position and the plate 40 is moving.

In order to remove the threaded workpiece W from the plug 84, a second pair of jaws 88 is positioned in the slot 54 formed in the movable plate 40. The jaws 88 each have a slot 90 for receiving one of the cam pins 52. The jaws 88 are normally biased in a direction towards each other by means of springs 92 that extend between the outer end of each of the jaws 88 and the outer end of the slots 54. In addition, as shown best in FIG. 8, the second pair of jaws 88 have a beveled undersurface 94 at the confronting ends thereof in order to facilitate the stripping of the threaded workpiece W from the plug 84. That is, as will be described more fully hereinafter, the center of the second pair of jaws 88 is positioned coaxially with the axis of the plug 84 and the axis of the workpiece W thereon when the piston 82 is retracted.

Thus, as the hexagonal portion D of the workpiece W moves upwardly, it will first bear against the beveled ends 94 and will force the second pair of jaws 88 outwardly against the force of the springs 92. When the hexagonal portion D passes the upper surface of the second pair of jaws 88, the springs 92 will urge the jaws 88 towards each other once again thereby permitting the innermost portions of the jaws 88 to be positioned directly underneath the hexagonal portion D of the workpiece W so that the workpiece is held and removed from the plug 84 as the piston 82 and the plug 84 thereon move upwardly.

Movement of the slidable plate 40 to the left by means of the piston rod 44 will, as mentioned above, concurrently remove an unthreaded workpiece W from the pin 28 and will also move the jaws 88 and the workpiece held thereby to the left for alignment of the opening 48 in the movable plate 40 with the opening 23 in the fixed plate 20. It should be noted at this time that when the cam pins 52 are in the slots 50, the jaws 88 will be in their closed position, but when the cam pins 52 are in the cam slots 90, the jaws 88 will then be retracted so that the threaded workpiece W may fall through the aligned openings 48 and 23 in the movable plate 40 and the fixed plate 22, respectively.

It is also noted that the piston 82 remains in the up position as the plate 40 moves from the right position to the left position, where the plug 84 is below the plate 40 when the plate 40 moves from the left position to the right position. Therefore, the plug 84 is driven downwardly through the recess 56 and returned upwardly through the opening 48, with the piston 82 passing horizontally through the slot 58.

A pinion 94 is mounted on a shaft 96 that is journaled in a table 98 on which the fixed plate 22 is mounted. The pinion 94 meshingly engages an upper rack 100 that is rigidly secured to and is movable together with the plate 40. The pinion 94 also meshingly engages a lower rack 102 which is secured to an inclined trough 104 by means of a bracket 106. It will be appreciated that, as the plate 40 moves to the right for example, the pinion 94 will rotate in a clockwise direction and the rack 102, together with the trough 104, will move to the left. Conversely, when the rack 100 moves to the left, the pinion 94 will rotate in a counterclockwise direction thereby driving the lower rack 102 and the trough 104 to the right. When the finished or threaded workpiece W falls through the aligned holes 48 and 23 in the movable plate 40 and the fixed plate 23, respectively, it will be deposited in the trough 104 so that it may be subsequently removed by any suitable means (not shown).

When the unthreaded workpieces W are loaded into the chute 12, one above the other as shown in FIG. 2 for example, they will drop down by force of gravity so that the lowermost workpiece W is seated on the pin 28 which is biased upwardly, above the surface of a fixed plate 22 by means of the spring 30. The movable plate 40, together with the jaws 60 mounted pivotally thereon, will then be moved to the right by the piston 44 and the air cylinder associated therewith. The air cylinder is controlled through a valve (not shown) which is actuated by a cam (not shown) that is mounted on and operated by the apparatus that drives the thread cutting rollers 86. The cam follower 74 engages and pushes the sloping cam 76 downwardly to thereby withdraw the pin 28 from the lowermost workpiece W so that the jaws 60 may engage the workpiece W. It should be noted at this time, that movement of the plate 40 to the right and engagement of the jaws 60 with the lowermost workpiece W will also move the hexagonal portion D of the workpiece W into the slot 38A formed in the block 38 to thereby temporarily retain the workpiece W so that the normally closed jaws 60 may be spaced apart in opposition to the force exerted by the springs 68.

Figure 8:
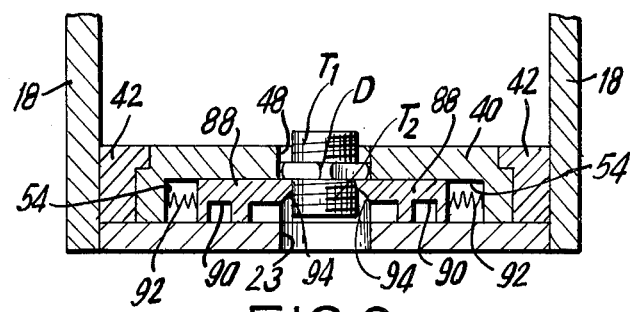
FIG. 8 is another transverse sectional elevational view taken along line 8—8 of FIG. 6.

At this particular point in time when the plate 40 is positioned at the right, the piston rod 82 of the cylinder 80 is extended downwardly through the opening 48 as shown in FIG. 3, so that the plug 84 may upwardly retract a threaded workpiece W mounted thereon, assuming of course that the machine has been in operation through at least one complete cycle. In the first cycle of operation there will be no threaded workpiece to be picked up. It will also be appreciated that, since the movable plate 40 has moved to the right in order to pick up the lowermost workpiece W in the jaws 60, the hole 48 will be in alignment coaxially with the piston rod 82 so that the plug 84 can move therethrough. On the upward stroke of the piston rod 82, a finished workpiece W will be stripped from the plug 84 by means of the second pair of jaws 88 which are normally in their extended position. As mentioned hereinabove, and as shown in FIG. 8, the lower face at the inner confronting ends of the jaws 88 are beveled so that when the piston rod 82 moves upwardly, the workpiece W that has already been threaded will force the second jaws 88 outwardly or away from each other and against the force of the springs 92. When the jaws 88 are in the position shown in FIG. 8, the springs 92 exert a force in a direction such that the jaws 88 will firmly retain the finished workpiece W.

The piston 44 will now be retracted or moved to the left until the cam pins 52 are in the angularly oriented slots 90 in the jaws 88 causing the jaws 88 to separate and permitting the workpiece W to fall through the now aligned hole 48 in the movable plate 40 and hole 23 in the fixed plate 22, respectively, in order to drop into the trough 104.

Figure 4:
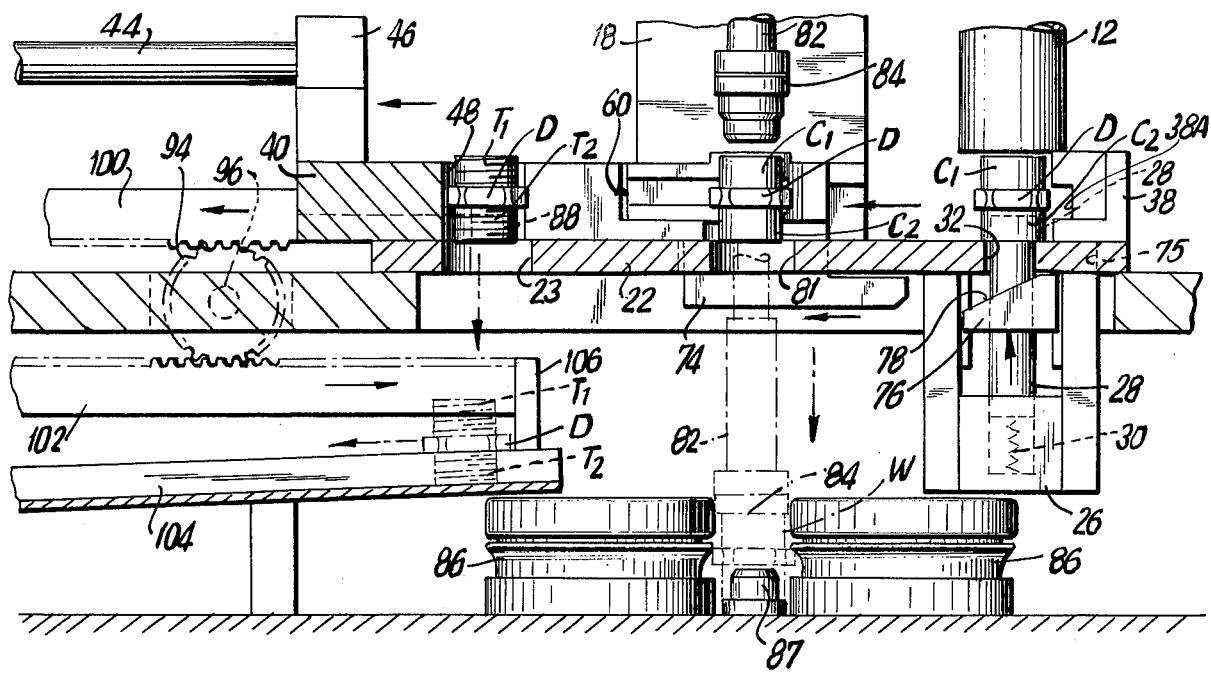
FIG. 4 is a longitudinal sectional elevational view similar to FIG. 2 and to FIG. 3 but illustrating still another step in the cycle of operation.

At this time, there will be an unthreaded workpiece positioned in the jaws 60, as shown in FIG. 4, which will then be pushed downwardly by the piston rod 82 and the plug 84 as described above, onto the arbor of the thread cutting machine intermediate the thread cutting rollers 86. At this time, the thread cutting rollers 86 will clamp the workpiece W in a conventional manner and the piston rod 82 will remain down until the plate 40 is moved to the right for the next operation. While the jaws 88 and the piston rod 82 are operating as just described, the next workpiece W will drop over the pin 28 so as to be ready to be picked up by the jaws 60 when they move to the right during the next operating cycle.

From the foregoing, it will be appreciated that an improved attachment has been provided for thread cutting apparatus. The attachment of the present invention virtually eliminated all manual operations in the feeding of tublar workpieces to the thread cutting apparatus and the removal therefrom of a finished workpiece. The combination of structural elements described hereinabove reduces or minimizes time lost between various portions of the operating cycle and thereby greatly increases the speed of production in order to reduce the cost of finishing each workpiece.

Numerous alterations of the structure herein disclosed will suggest themselves to those skilled in the art. However, it is to be understood that the present disclosure relates to a preferred embodiment of the invention which is for purposes of illustation only and is not to be construed as a alimitation of the invention.

What is claimed is:

1. An attachment for an apparatus for forming threads on a tubular workpiece, said attachment comprising:

a stationary base plate;

delivery means for supplying a stream of workpieces to a receiving station on said base plate;

reciprocating means movable along said base plate for gripping and removing one workpiece at a time from said receiving station;

transfer means for moving the workpiece from said reciprocating means through a first opening in said base plate of thread cutting means and for subsequently removing the workpiece from the thread cutting means after the threads are cut;

discharge means for releasably receiving a threaded workpiece from said transfer means, said discharge means being movable in synchronism with said reciprocating means and in timed relationship with said transfer means to engage the threaded workpiece at approximately the same time that said reciprocating means grips an unthreaded workpiece, said discharge means being arranged to release the threaded workpiece at approximately the same time that said transfer means initiate the movement of the unthreaded workpiece towards the thread cutting means;

said delivery means including a vertically oriented tubular chute in which the workpieces are positioned one above the other, a retractable positioning pin positioned coaxially below said chute whereby the force of gravity drops the lowermost workpieces onto said pin, spring means for biasing said pin through a second opening in said base plate to receive the lowermost workpiece;

said reciprocating means including a movable plate disposed on said base plate; a first pair of opposed gripping jaws mounted on said movable plate and means for reciprocatingly moving said movable plate, said first pair of jaws grasping the lowermost workpiece associated with said pin and then removing the workpiece from said receiving station;

said pin including first cam surface means integral therewith, said movable plate including first cam means integral therewith for engaging said first cam surface means to depress said pin into said second opening against the biasing of said spring means when said movable plate moves said first pair of jaws past said pin, so that the lowermost workpiece is free from said pin and may be grasped by said first pair of jaws and removed from said receiving station;

said transfer means including an actuator having an axially movable piston rod that has a selected dimension so that a free end thereof may be received in one end of the tubular workpiece, said piston rod dimension permitting said piston rod to pass between said first pair of jaws and to pass through said first opening in said base plate so that the workpiece may be transported to said cutting means, said piston rod dimension further permitting said piston rod to pass through a third opening in said base plate so that the threaded workpiece may be removed from said cutting means to a surface of said base plate;

said discharge means including a second pair of opposed, spring biased jaws on said movable plate in association with said third opening, said second pair of jaws being arranged to grip the workpiece after the threads are cut thereon and after the workpiece is removed from said cutting means, the threaded workpiece being retained in said third opening and moved with said movable plate along said surface of said base plate to a discharge area.

2. An attachment according to claim 1 wherein said means for reciprocatingly moving said movable plate is a linear actuator having an axially piston rod coupled to said plate.

3. An attachment according to claim 1 wherein there is further included means for guiding said movable plate during the reciprocating movement thereof.

4. An attachment according to claim 1 wherein said first pair of jaws are pivotally mounted on said movable plate and are normally spring biased towards each other, said first pair of jaws being spread apart from each other by the workpiece as said first pair of jaws move therepast.

5. An attachment according to claim 1 further including a fixed block adjacent said pin for temporarily retaining the workpiece when said pin is retracted and the workpiece is being grasped by said first pair of jaws.

6. An apparatus according to claim 1 wherein the free end of said piston rod includes a removable plug.

7. An apparatus according to claim 1 wherein said second pair of jaws are beveled whereby the threaded workpiece may be automatically stripped from said piston rod of said transfer means and gripped by said second pair of jaws when said piston rod is retracted.

8. An apparatus according to claim 1 wherein there is further included opening means for spreading apart said second pair of jaws, said opening means comprising non-movable cam pins disposed adjacent to said movable plate and associated cam slots in said second pair of jaws for receiving said cam pins, whereby after said movable plate completes its travel in one direction, said cam slots will engage said cam pins and thereby spread apart said second pair of jaws.

9. An apparatus according to claim 8 wherein said discharge means further comprises a trough for receiving the threaded workpiece after said second pair of jaws are open, said trough being positioned below said base plate.

* * * * *